United States Patent
Suzuki et al.

(10) Patent No.: US 11,241,952 B1
(45) Date of Patent: Feb. 8, 2022

(54) FUEL FILLER STRUCTURE

(71) Applicant: HONDA MOTOR CO., LTD., Tokyo (JP)

(72) Inventors: Tsubasa Suzuki, Tokyo (JP); Ryoji Ando, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/015,108

(22) Filed: Sep. 9, 2020

(51) Int. Cl.
*B60K 15/04* (2006.01)

(52) U.S. Cl.
CPC .... *B60K 15/0406* (2013.01); *B60K 2015/048* (2013.01); *B60K 2015/0429* (2013.01); *B60K 2015/0461* (2013.01); *B60K 2015/0474* (2013.01)

(58) Field of Classification Search
CPC ........ B60K 15/0406; B60K 2015/0461; B60K 2015/048; B60K 2015/0429; B60K 2015/0474
See application file for complete search history.

(56) References Cited

U.S. PATENT DOCUMENTS

| | | | |
|---|---|---|---|
| 2019/0061517 A1* | 2/2019 | Hagano | B60K 15/04 |
| 2019/0232781 A1* | 8/2019 | Hagano | B60K 15/04 |
| 2019/0299774 A1* | 10/2019 | Hlberg | B60K 15/0406 |

FOREIGN PATENT DOCUMENTS

JP 5617694 11/2014

* cited by examiner

*Primary Examiner* — Jason K Niesz
(74) *Attorney, Agent, or Firm* — Amin, Turocy & Watson, LLP (57) ABSTRACT

A fuel filler structure includes a base member, a shutter member, a seal part, and an opening part. The base member includes a fuel filler port and a fuel filler port outer circumferential part which is provided outward further than the fuel filler port. In the shutter member, an opening-closing valve is supported movable to a closed position and an open position. The seal part is arranged between the fuel filler port outer circumferential part and the opening-closing valve when the opening-closing valve is located at the closed position. The opening part connects together an outer surface and an inner surface of the fuel filler port outer circumferential part, and a second opening end of the opening part is arranged at a position that overlaps the opening-closing valve when the opening-closing valve is located at the closed position.

4 Claims, 7 Drawing Sheets

FUEL FILLER STRUCTURE

BACKGROUND

Field of the Invention

The present invention relates to a fuel filler structure.

Background

A so-called capless fuel filler structure is known as a fuel filler structure for feeding fuel to a fuel tank of an automobile or the like. In the fuel filler structure, a shutter member that closes a fuel filler port is provided on an upper end part of a fuel pipe, and a seal part is arranged between the shutter member and an outer circumferential part of the fuel filler port when the shutter member is arranged at a position at which the fuel filler port is closed.

According to the fuel filler structure, the shutter is pushed by a fuel filler gun and thereby moves (rotates) to an inside of the fuel pipe. Thereby, the fuel filler gun is inserted into the fuel pipe through the fuel filler port, and the fuel is fed to the fuel tank via the fuel pipe from the fuel filler gun (for example, refer to Japanese Patent No. 5617694).

SUMMARY

However, the fuel filler port of the fuel filler structure is provided so as to open diagonally upward in most cases. The fuel filler port is provided on an opposite side of the seal part where the fuel filler gun is inserted. An opening surface of the fuel filler port, for example, may be raised diagonally upward to a height of a certain degree. Therefore, it is conceivable that the fuel that is spilled from the fuel filler gun at the time of feeding the fuel is left behind on the opening surface of the fuel filler port.

An aspect of the present invention provides a fuel filler structure which is capable of preventing fuel that is spilled from a fuel filler gun at the time of feeding the fuel from being left behind.

A fuel filler structure according to a first aspect of the present invention includes: a base member that is attached to an upper end part of a fuel pipe which supplies fuel to a fuel tank and that includes a fuel filler port in which a fuel filler gun is inserted and a fuel filler port outer circumferential part which is provided radially outward further than the fuel filler port; a shutter member that is attached to the base member and that is movable to a position at which the fuel filler port is closed and to a position at which the fuel filler port is opened; a seal part that is arranged between the fuel filler port outer circumferential part and the shutter member when the shutter member is located at the position at which the fuel filler port is closed; and an opening part that is formed on the fuel filler port outer circumferential part and that connects together a first surface of the fuel filler port outer circumferential part positioned on an insertion side of the fuel filler gun and a second surface of the fuel filler port outer circumferential part positioned on a side of the shutter member, wherein an opening end that opens to the side of the shutter member of the opening part is arranged at a position that overlaps the shutter member in a view from the insertion side of the fuel filler gun when the shutter member is located at the position at which the fuel filler port is closed.

According to the configuration of the first aspect, the opening part is formed in the fuel filler port outer circumferential part, and the first surface and the second surface of the fuel filler port outer circumferential part are connected together (communicate with each other) by the opening part. The first surface is positioned on the insertion side of the fuel filler gun, and the second surface is positioned on the shutter member side. Further, the opening part has the opening end that opens to the shutter member side. The opening end is arranged at a position that overlaps the shutter member when seen from the insertion side of the fuel filler gun when the shutter member is located at the position at which the fuel filler port is closed. The opening end is in communication with the fuel filler port when the shutter member is located at the position at which the fuel filler port is closed.

Accordingly, for example, fuel that is spilled to the fuel filler port from the fuel filler gun at the time of feeding the fuel can be guided to the opening end of the opening part. Further, the fuel guided to the opening end can be guided through the opening part to the outside and be discharged. Thereby, it is possible to prevent the fuel that is spilled from the fuel filler gun at the time of feeding the fuel from being left behind in the fuel filler structure.

As a second aspect of the present invention, the opening part may be provided at one or more positions in a vicinity of a lower end part in a vehicle vertical direction of the fuel filler port and may include a lower surface that is formed on a lower side in a vehicle vertical direction of the opening part and that is tilted downward relative to a horizon in accordance with a direction from the second surface to the first surface.

The opening end is arranged at the position that overlaps the shutter member when seen from the insertion side of the fuel filler gun when the shutter member is located at the position at which the fuel filler port is closed. Accordingly, it is conceivable that the seal part faces the opening end. Therefore, it is conceivable that the fuel guided to the opening end touches the seal part and becomes difficult to flow smoothly to the opening part.

Accordingly, in the configuration of the second aspect, the lower surface of the opening part is tilted downward relative to the horizon in accordance with the direction from the second surface to the first surface. Thereby, the fuel or the like that is spilled from the fuel filler gun is efficiently discharged to the outside through the opening part, for example, without accumulating on the outer surface of the seal part.

As a third aspect of the present invention, the fuel filler port may have a diameter which is smaller than an inner diameter of the seal part.

According to the configuration of the third aspect, the fuel filler port has a smaller diameter than the inner diameter of the seal part, and thereby, it is possible to prevent fuel, water, dust, or the like from entering the seal part from the fuel filler port. Thereby, for example, it is possible to prevent the seal property of the seal part from being degraded by the fuel, water, dust, or the like. Further, for example, the fuel, water, dust, or the like that comes into contact with the seal part can be discharged to the outside from the opening part through the opening end that faces the seal part.

A fuel filler structure according to a fourth aspect of the present invention may include: a fuel filler port protrusion part that extends in a circumferential direction along an opening surface of the fuel filler port and that protrudes toward the shutter member from a vicinity of the opening surface when the shutter member is located at the position at which the fuel filler port is closed; and a shutter member protrusion part that is formed on the shutter member and that extends in a circumferential direction along the fuel filler port protrusion part at a radially outer side than the fuel filler port protrusion part and protrudes toward the fuel filler port outer circumferential part when the shutter member is located at the position at which the fuel filler port is closed, wherein the opening part may open radially outward further than the fuel filler port protrusion part.

According to the configuration of the fourth aspect, the fuel filler port protrusion part extends along the opening surface of the fuel filler port. Further, when the shutter member is located at the position at which the fuel filler port is closed, the shutter member protrusion part extends along the fuel filler port protrusion part at a radially outer side than the fuel filler port protrusion part. Accordingly, a space having a labyrinth form can be formed between the fuel filler port and the seal part in a radial direction by the fuel filler port protrusion part and the shutter member protrusion part. Thereby, it is possible to prevent dust or the like from entering the seal part from the fuel filler port by the labyrinth space.

Further, the opening part opens to a radially outer side than the fuel filler port protrusion part. Accordingly, it is possible to prevent dust or the like from entering the fuel filler port from the opening part by the fuel filler port protrusion part or the like.

In this way, a labyrinth space is formed of the fuel filler port protrusion part and the shutter member protrusion part, and furthermore, the opening part opens to a radially outer side than the fuel filler port protrusion part. Thereby, it is possible to prevent dust or the like from entering the seal part from the fuel filler port, and it is possible to further favorably prevent the seal property of the seal part from being degraded by the dust or the like.

As a fifth aspect of the present invention, the shutter member may include a projection part that protrudes toward the insertion side of the fuel filler gun at a radially inner side of the fuel filler port when the shutter member is located at the position at which the fuel filler port is closed.

According to the configuration of the fifth aspect, when the shutter member is located at the position at which the fuel filler port is closed, the projection part of the shutter member is arranged at a radially inner side of the fuel filler port and furthermore, for example, protrudes from the fuel filler port toward the insertion side of the fuel filler gun. Accordingly, the fuel that leaks from the fuel filler gun at the time of feeding the fuel can be received by the projection part, and it is possible to prevent the fuel that leaks from the fuel filler gun at the time of feeding the fuel from entering the inside of the fuel filler port. Thereby, it is possible to prevent the fuel that leaks from the fuel filler gun at the time of feeding the fuel from being directed to the seal part through the fuel filler port.

According to the aspect of the present invention, it is possible to prevent the fuel that is spilled from the fuel filler gun at the time of feeding the fuel from being left behind.

DESCRIPTION OF THE EMBODIMENTS

Hereinafter, a fuel filler structure according to embodiments of the present invention will be described with reference to the drawings. In the drawings, an arrow FR indicates a frontward direction of a vehicle, an arrow UP indicates an upward direction of the vehicle, and an arrow OS indicates an outside direction of the vehicle.

Figure 1:
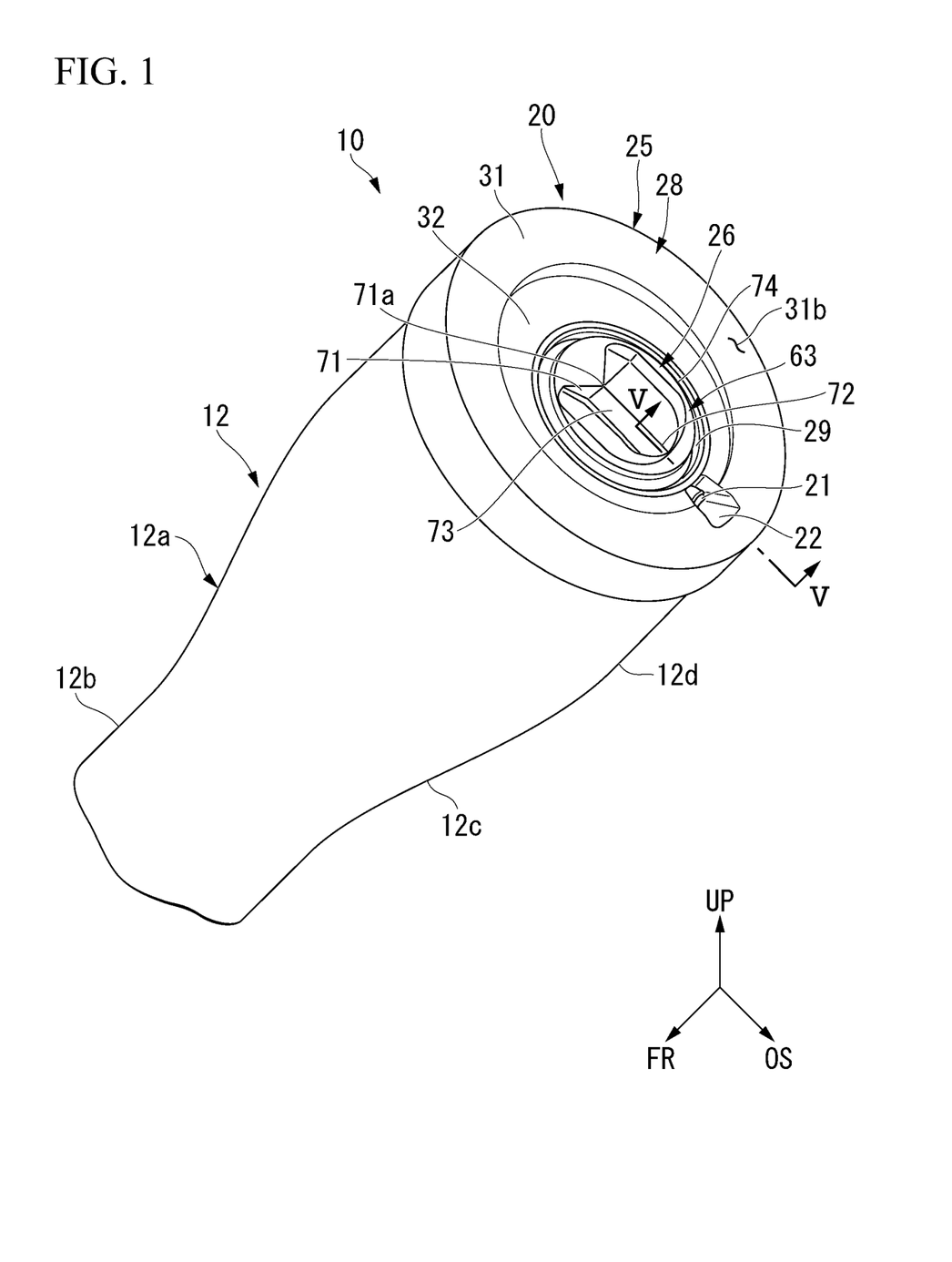
FIG. 1 is a perspective view showing a fuel filler structure according to a first embodiment of the present invention.

FIG. 1 is a perspective view showing a fuel filler structure 10 according to a first embodiment.

Figure 2:
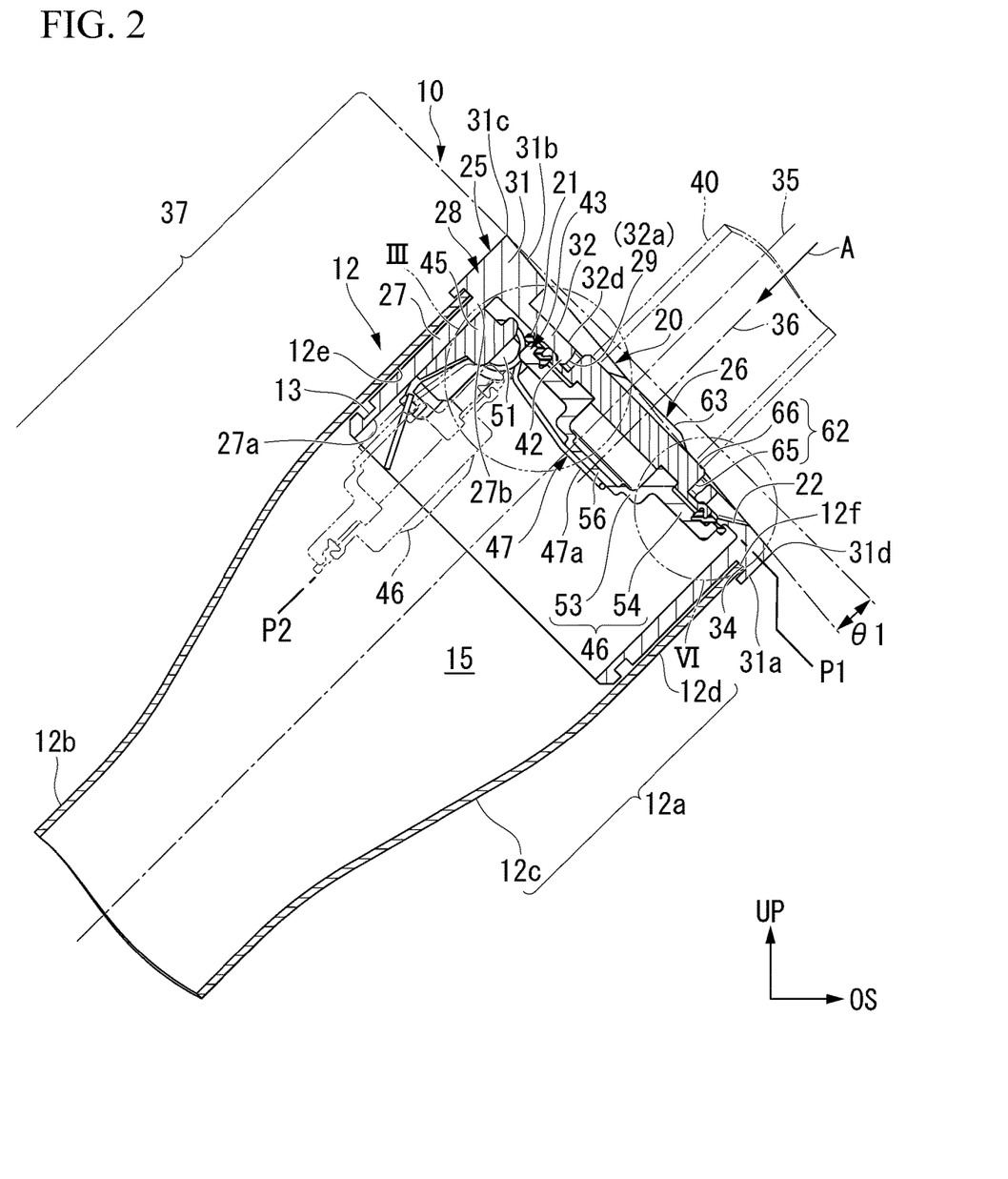
FIG. 2 is a cross-sectional view showing the fuel filler structure according to the first embodiment.

FIG. 2 is a cross-sectional view showing the fuel filler structure 10 according to the first embodiment.

First Embodiment

<Fuel Filler Structure>

As shown in FIG. 1 and FIG. 2, the fuel filler structure 10 is a so-called capless structure which does not require a cap for closing a fuel filler port 29. The fuel filler structure 10 is attached to an upper end part 12d of a fuel pipe 12 which supplies fuel to a fuel tank (not shown).

In the fuel pipe 12, for example, a lower end part is connected to the fuel tank so as to communicate with the fuel tank, and an upper part 12a extends to be tilted outward in a vehicle width direction in accordance with a direction toward an upward direction from another part 12b. The upper part 12a of the fuel pipe 12 is formed, for example, such that a diameter of a diameter enlarging part 12c is gradually enlarged from the other part 12b of the fuel pipe 12 to an upper end part 12d, and the upper end part 12d is formed at a constant diameter in a large diameter on the diameter enlarging part 12c. The fuel filler structure 10 is provided on the upper end part 12d formed in a large diameter.

The fuel filler structure 10 includes an opening-closing mechanism 20, a seal part 21, and an opening part 22.

<Opening-Closing Mechanism>

The opening-closing mechanism 20 is attached to the upper end part 12d of the fuel pipe 12. Specifically, the opening-closing mechanism 20 includes a base member 25 and a shutter member 26.

The base member 25 includes a fuel filler port attachment part 27, a fuel filler port outer circumferential part 28, and a fuel filler port 29.

The fuel filler port attachment part 27 is formed, for example, in a cylindrical shape and is inserted along an inner circumferential surface 12e of the upper end part 12d of the fuel pipe 12. A lower end part 27a is latched by a projection 13 of the inner circumferential surface 12e, and thereby, the fuel filler port attachment part 27 is attached to the upper end part 12d of the fuel pipe 12. The fuel filler port outer circumferential part 28 is integrally formed on an upper end 27b of the fuel filler port attachment part 27.

The fuel filler port outer circumferential part 28 is formed, for example, in a ring form and includes a first ring part 31 and a second ring part 32.

The first ring part 31 is formed in a ring form integrally on the upper end 27b of the fuel filler port attachment part 27, and a step part 34 is formed on the lower end part 31a of the first ring part 31. An upper edge 12f of the fuel pipe 12 is in contact with the step part 34. An outer surface 31b of the first ring part 31 is formed, for example, to be tilted by a tilt angle θ1 from an upper end part 31c toward a lower end part 31d relative to a plane orthogonal to a first axis line 35 of the fuel filler structure 10. An outer cylinder part 37 of the fuel pipe 12 is formed of the fuel pipe 12 and the first ring part 31. A second ring part 32 is formed integrally on an inner circumference of the first ring part 31.

The second ring part 32 extends orthogonal to the first axis line 35 from the inner circumference of the first ring part 31 toward a radially inner side perpendicular to the first axis line 35.

The second ring part 32 is formed, for example, such that an inner circumferential surface 32a has a circular shape about the second axis line 36. In the second ring part 32, for example, the inner circumferential surface 32a has a constant height in a direction of the second axis line 36. The second axis line 36 extends in parallel with the first axis line 35 to be spaced in a lower direction from the first axis line 35. Hereinafter, the direction of the second axis line 36 may be referred to as an "axis line direction".

The fuel filler port 29 is formed of the inner circumferential surface 32a of the second ring part 32. Accordingly, the fuel filler port 29 is formed, for example, coaxially with respect to the second axis line 36. The second ring part 32 is provided at a radially outer position than the fuel filler port 29.

A fuel filler gun 40 is inserted in the fuel filler port 29 in an insertion direction of an arrow A. The fuel filler gun 40 is inserted in the fuel pipe 12 from the fuel filler port 29, and fuel is fed to the fuel tank from the fuel filler gun 40.

Figure 3:
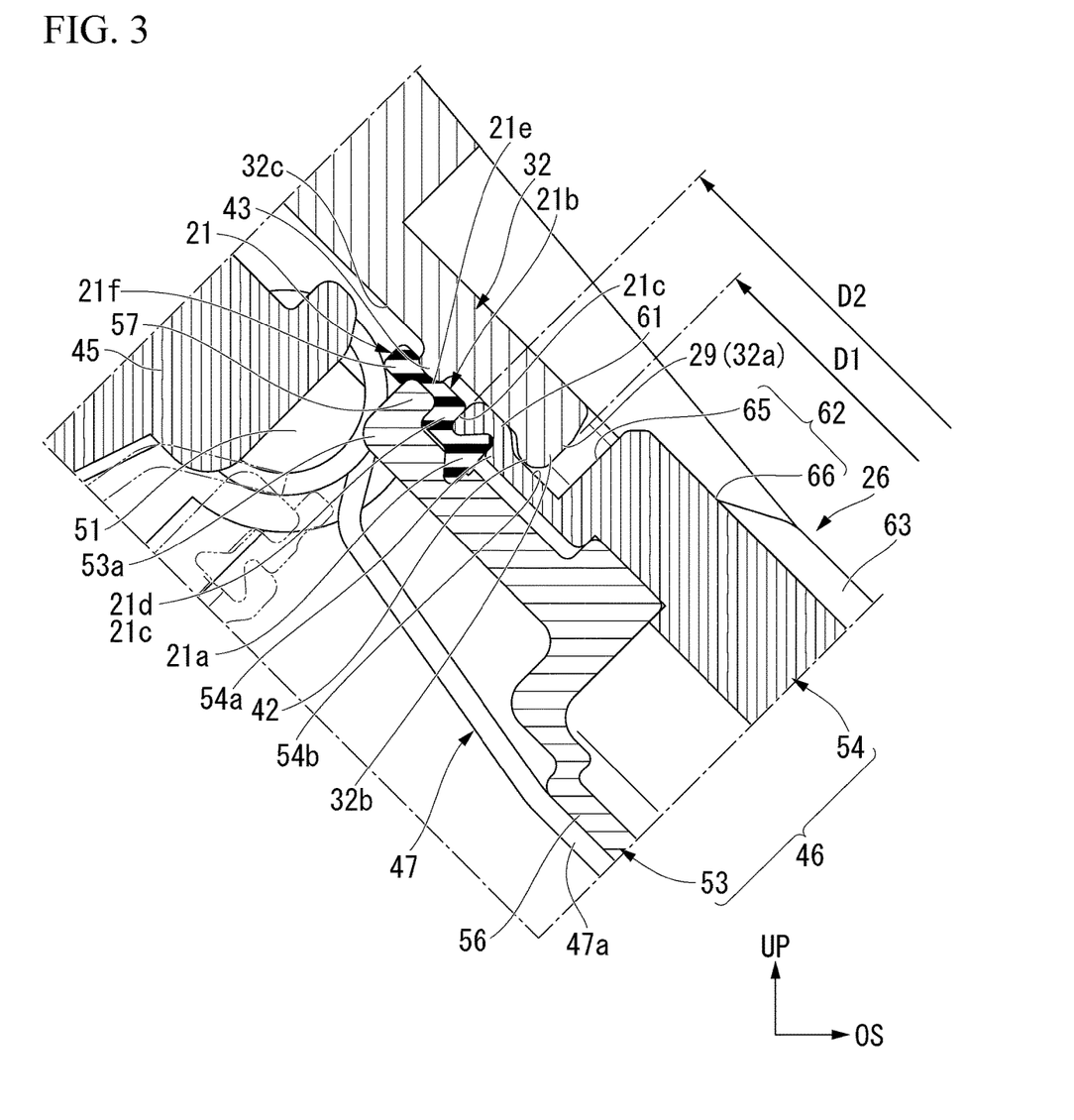
FIG. 3 is an enlarged cross-sectional view of a III portion of FIG. 2.

FIG. 3 is an enlarged cross-sectional view of a III portion of FIG. 2.

As shown in FIG. 2 and FIG. 3, the second ring part 32 includes a fuel filler port protrusion part 42 and a first seal protrusion 43.

The fuel filler port protrusion part 42 is formed on an end part (that is, near the opening surface 32a) 32b on a side of the shutter member 26 of the opening surface 32a of the fuel filler port 29 in the axis line direction. Specifically, the fuel filler port protrusion part 42 extends in a ring form in a circumferential direction along the opening surface (that is, the inner circumferential surface 32a of the second ring part 32) of the fuel filler port 29 in the end part 32b of the opening surface 32a. Hereinafter, the inner circumferential surface 32a may be referred to as the "opening surface 32a".

Further, the fuel filler port protrusion part 42 protrudes in the axis line direction from the end part 32b of the opening surface 32a toward the shutter member 26 when an opening-closing valve 46 described below is located at a position P1 at which the fuel filler port 29 is closed.

The first seal protrusion 43 is formed, for example, on an inner surface 32c of the second ring part 32 in a ring shape along the fuel filler port protrusion part 42 to be spaced from the fuel filler port protrusion part 42 at a radially outer side than the filler port protrusion part 42. Specifically, the first seal protrusion 43 is formed, for example, in a ring shape in a portion that excludes the opening part 22 described below.

Further, the first seal protrusion 43 protrudes in the axis line direction toward the shutter member 26 from the inner surface 32c of the second ring part 32 when the opening-closing valve 46 described below is located at the position P1 at which the fuel filler port 29 is closed.

The fuel filler port protrusion part 42 and the first seal protrusion 43 will be described in detail below.

The shutter member 26 includes a support member 45, the opening-closing valve 46, and a return spring 47.

The support member 45 is fixed to an upper portion of the inner circumferential surface 27a of the fuel filler port attachment part 27. The opening-closing valve 46 is rotatably supported via a hinge part 51 by the support member 45. That is, the hinge part 51 is attached to the upper portion of the fuel filler port attachment part 27.

The opening-closing valve 46 is connected via the hinge part 51 to the support member 45 so as to be movable (rotatable) to the position P1 at which the fuel filler port 29 is closed and to a position P2 at which the fuel filler port 29 is opened. Hereinafter, the position P1 at which the fuel filler port 29 is closed may be referred to as a "closed position P1", and the position P2 at which the fuel filler port 29 is opened may be referred to as an "open position P2".

The opening-closing valve 46 is arranged at a position that is orthogonal to the second axis line 36 and at a position that overlaps the second ring part 32 in the axis line direction in a state of being arranged at the closed position P1. The opening-closing valve 46 is arranged at a position along the second axis line 36 in a state of being arranged at the open position P2.

The first embodiment is described using an example in which the hinge part 51 is attached to the upper portion of the fuel filler port attachment part 27; however, the embodiment is not limited thereto. As another example, the hinge part 51 may be attached to, for example, a lower portion, a left portion, a right portion, or the like of the fuel filler port attachment part 27.

Specifically, the opening-closing valve 46 includes a first valve 53 and a second valve 54. The first valve 53 is arranged on an opposite side of the fuel filler port 29 when the opening-closing valve 46 is arranged at the closed position P1, and, for example, an outer circumferential part 53a is formed in a circular shape. The first valve 53 includes an expansion part 56 and a second seal protrusion 57.

The expansion part 56 is formed on a middle part of the first valve 53 in a radial direction of the second axis line 36. A radial direction of the second axis line 36 may be simply referred to as a "radial direction". The expansion part 56 is formed in a circular shape having the same axis as the second axis line 36 and expands to an inner part 15 of the fuel pipe 12, for example, when the opening-closing valve 46 is arranged at the closed position P1.

The second seal protrusion 57 is formed, for example, in a ring shape along the outer circumferential part 53a. Further, the second seal protrusion 57 protrudes toward the inner surface 32c of the second ring part 32 from the outer circumferential part 53a of the first valve 53 when the opening-closing valve 46 is arranged at the closed position P1.

The expansion part 56 and the second seal protrusion 57 will be described in detail below.

The second valve 54 is arranged closer to the fuel filler port 29 than the first valve 53 in the axis line direction, and, for example, an outer circumferential part 54a is formed in a circular shape. The outer circumferential part 54a of the second valve 54 is formed to have a diameter which is smaller than that of the outer circumferential part 53a of the first valve 53. The second valve 54 includes a shutter member protrusion part 61, a projection part 62, and a guide part 63.

The shutter member protrusion part 61 is formed on the outer circumferential part 54a of the second valve 54 in the radial direction. The shutter member protrusion part 61 is formed to extend in a circumferential direction along the opening surface 32a or the fuel filler port protrusion part 42 at a radially outer side than the fuel filler port protrusion part 42 when the opening-closing valve 46 is arranged at the closed position P1. Further, the shutter member protrusion part 61 is formed to protrude toward the inner surface 32c of the second ring part 32 from the outer circumferential part 54a of the second valve 54 when the opening-closing valve 46 is arranged at the closed position P1.

That is, the shutter member protrusion part 61 is arranged to be in contact with or close to the fuel filler port protrusion part 42 at the outside of the fuel filler port protrusion part 42 in the radial direction when the opening-closing valve 46 is arranged at the closed position P1. Further, the shutter member protrusion part 61 is arranged to be in contact with or close to the inner surface 32c of the second ring part 32. Further, the fuel filler port protrusion part 42 is arranged to be in contact with or close to an outer surface 54b of the second valve 54.

Thereby, a labyrinth space having a concave and convex shape in the radial direction is formed of the fuel filler port protrusion part 42, the shutter member protrusion part 61, and the like. The labyrinth space is formed in a ring shape that is continuous in the circumferential direction.

The shutter member protrusion part 61 can be desirably connected in a ring shape in which the entire circumference is continuous but may not be connected in a continuous manner. The he fuel filler port protrusion part 42 can be desirably connected in a ring shape in which the entire circumference is continuous but may not be connected in a continuous manner.

Figure 4:
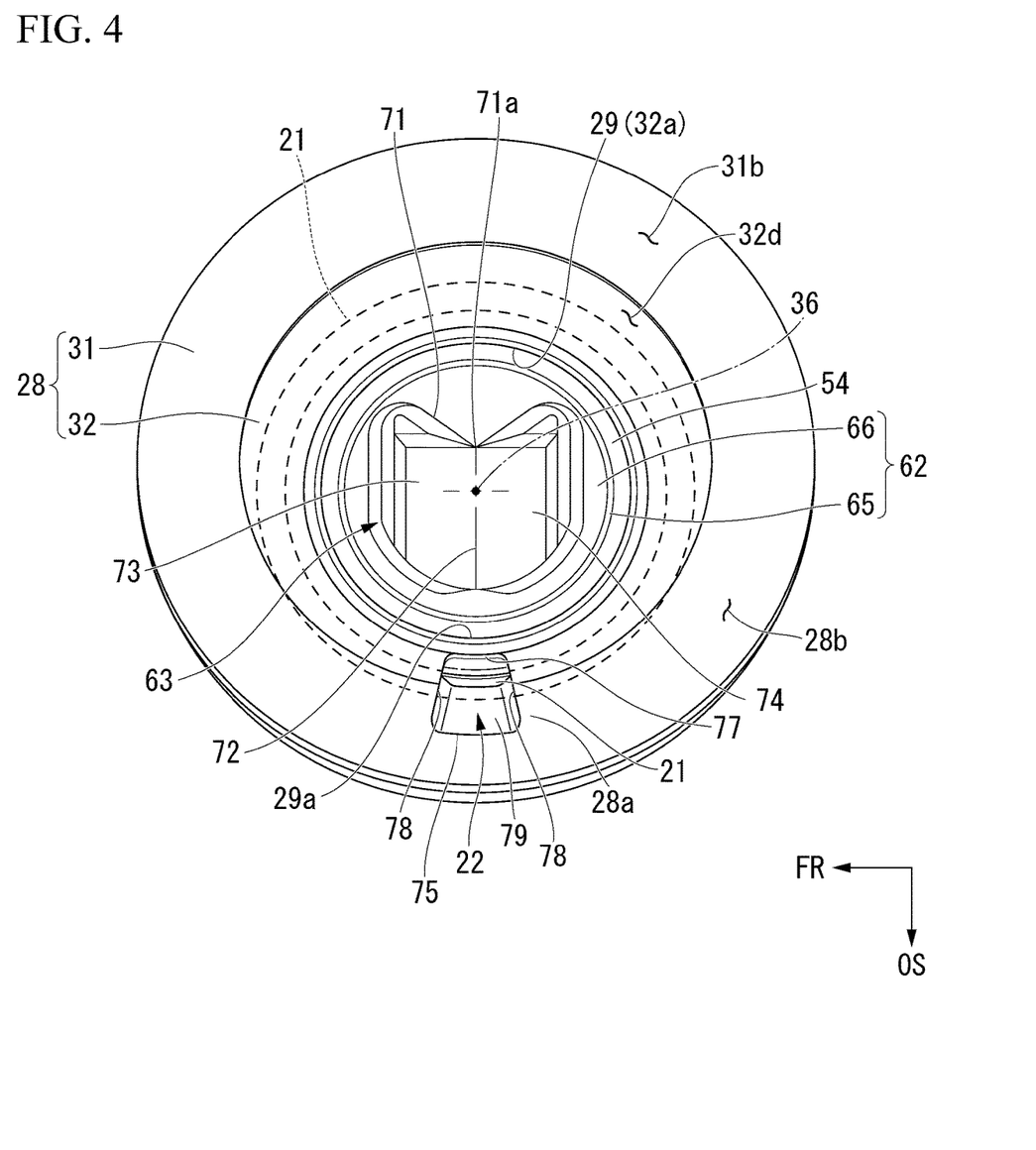
FIG. 4 is a plan view showing the fuel filler structure of the first embodiment when seen from an axis line direction.

FIG. 4 is a plan view showing the fuel filler structure 10 of the first embodiment when seen from the axis line direction.

As shown in FIG. 2 and FIG. 4, the projection part 62 is formed on a middle part of the second valve 54 in the radial direction. The projection part 62 is formed so as to protrude toward the insertion side of the fuel filler gun 40 at an inner part (inside in the radial direction) of the fuel filler port 29 when the opening-closing valve 46 is arranged at the closed position P1. The projection part 62 includes an outer circumferential surface 65 and a top surface 66.

The outer circumferential surface 65 is formed, for example, coaxially with respect to the axis line direction and is formed so as to protrude toward the insertion side of the fuel filler gun 40 from the opening surface 32a of the fuel filler port 29 when the opening-closing valve 46 is arranged at the closed position P1. Further, the outer circumferential surface 65 is formed, for example, in a circular shape along the opening surface 32a at a constant spacing from the opening surface 32a of the fuel filler port 29 at a radially inner side than the opening surface 32a of the fuel filler port 29 when the opening-closing valve 46 is arranged at the closed position P1. The constant spacing can preferably be small in a range in which the outer circumferential surface 65 is not in contact with the opening surface 32a of the fuel filler port 29 when the opening-closing valve 46 moves between the closed position P1 and the open position P2.

The top surface 66 is formed on an end part of the outer circumferential surface 65 at an opposite side of the first valve 53.

The top surface 66 is, for example, a flat surface formed in a circular shape coaxially with respect to the second axis line 36 when the opening-closing valve 46 is arranged at the closed position P1. Further, the top surface 66 is arranged, for example, on a further opposite side (insertion side of the fuel filler gun 40) of the first valve 53 than an outer surface 32d (that is, the fuel filler port 29) of the second ring part 32 in the axis line direction when the opening-closing valve 46 is arranged at the closed position P1.

As shown in FIG. 1 and FIG. 4, the guide part 63 includes an upper end portion 71, a valley portion 72, a first protrusion portion 73, and a second protrusion portion 74. The upper end portion 71 is formed in a V shape such that a middle section 71a is located at a lower position in a vehicle body front-to-rear direction. The valley portion 72 is formed to be directed downward from the middle section 71a of the upper end portion 71. The first protrusion portion 73 is formed to be gradually raised to the opposite side (insertion side of the fuel filler gun 40) of the first valve 53 in accordance with a direction from the valley portion 72 to a vehicle body frontward direction. The second protrusion portion 74 is formed to be gradually raised to the opposite side (insertion side of the fuel filler gun 40) of the first valve 53 in accordance with a direction from the valley portion 72 to a vehicle body rearward direction.

Thereby, the fuel or the like that is spilled from the fuel filler gun 40 to the fuel filler port 29 at the time of feeding the fuel can be guided from the middle section 71a of the upper end portion 71 to the valley portion 72. Further, the fuel or the like that is guided to the valley portion 72 can be efficiently guided via the valley portion 72 to the opening part 22 (described below).

With reference back to FIG. 2 and FIG. 3, the opening-closing valve 46 is integrally formed of the first valve 53 and the second valve 54 in a state where the first valve 53 and the second valve 54 are overlapped with each other in the axis line direction. In this state, the outer circumferential part 54a (particularly, the shutter member protrusion part 61) of the second valve 54 is arranged at a radially inner side than the outer circumferential part 53a (particularly, the second seal protrusion 57) of the first valve 53. A base portion 21a of the seal part 21 described below is attached between the first valve 53 and the second valve 54 in a sandwiched state. The seal part 21 extends to a radially outer side than the shutter member protrusion part 61 and the second seal protrusion 57.

The return spring 47 is a spring member that biases the opening-closing valve 46 by an elastic force such that the opening-closing valve 46 is held at the closed position P1. The return spring 47 is attached, for example, by being wound around the hinge part 51, and an end part 47a is in contact with the expansion part 56 of the first valve 53. Thereby, the hinge part 51 is held at the closed position P1 by the elastic force (biasing force) of the return spring 47.

On the other hand, in a state where the opening-closing valve 46 is held at the closed position P1, for example, the opening-closing valve 46 is pressed by the fuel filler gun 40 inserted from the fuel filler port 29. Thereby, the opening-closing valve 46 is moved (rotated) to the open position P2 against the elastic force of the return spring 47 by the pressing force of the fuel filler gun 40.

In this way, the first embodiment is described using a configuration of opening and closing the fuel filler port 29 by one opening-closing valve 46; however, the embodiment is not limited thereto. As another example, a configuration may be employed in which, for example, two opening-closing valves are operated as a double door (to open to both sides), and the fuel filler port 29 is opened and closed.

Further, the first embodiment is described using an example in which the opening-closing valve 46 is formed in a circular outer shape; however, the embodiment is not limited thereto. As another example, the opening-closing valve 46 may be formed in a rectangular outer shape, for example, if the fuel filler port 29 has a circular shape.

<Seal Part>

The seal part 21 is formed, for example, in a ring shape and is attached to an outer circumferential part of the opening-closing valve 46. The seal part 21 includes, for example, the base portion 21*a*, a protrusion portion 21*b*, and an inner circumferential surface 21*c*.

The base portion 21*a* is formed in a ring shape and is attached in a state of being sandwiched between the first valve 53 and the second valve 54.

The protrusion portion 21*b* protrudes in a ring shape radially outward from the base portion 21*a*. Specifically, the protrusion portion 21*b* extends, for example, to a radially outer side than the shutter member protrusion part 61. The protrusion portion 21*b* is formed, for example, in a U shape in a cross-section of a first protrusion section 21*d*, a second protrusion section 21*e*, and a third protrusion section 21*f*. The second protrusion section 21*e* is arranged, for example, in a state of being compressed between the first seal protrusion 43 of the second ring part 32 and the second seal protrusion 57 of the first valve 53 in the axis line direction when the opening-closing valve 46 is arranged at the closed position P1.

Accordingly, a space between the first seal protrusion 43 and the second seal protrusion 57 is sealed by the second protrusion section 21*e* (that is, the seal part 21). Thereby, when the opening-closing valve 46 is arranged at the closed position P1, the fuel filler port 29 is closed from the outside by the opening-closing valve 46 and the seal part 21.

The inner circumferential surface 21*c* of the seal part 21 is formed in a circular shape along the outer circumference of the shutter member protrusion part 61 in a state of being in contact with the outer circumference of the shutter member protrusion part 61. The inner circumferential surface 21*c* of the seal part 21 is arranged coaxially with the fuel filler port 29 when the opening-closing valve 46 is arranged at the closed position P1. The inner circumferential surface 21*c* of the seal part 21 is formed to have a diameter which is larger than that of the opening surface 32*a* of the fuel filler port 29. In other words, an opening diameter D1 of the fuel filler port 29 is smaller than that of an inner diameter D2 of the seal part 21.

<Opening Part>

Figure 5:
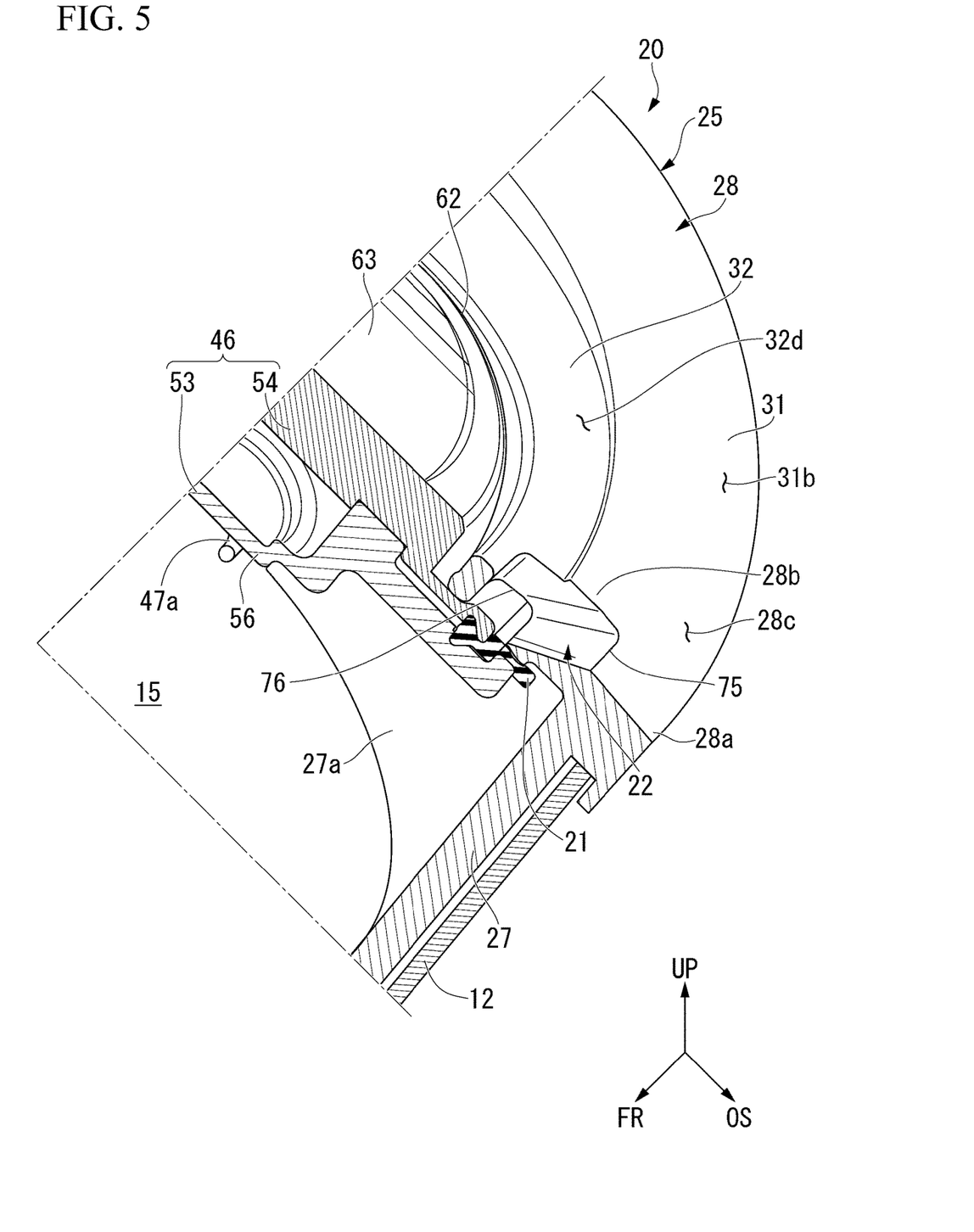
FIG. 5 is a cross-sectional view along a V-V line of FIG. 1.
Figure 6:
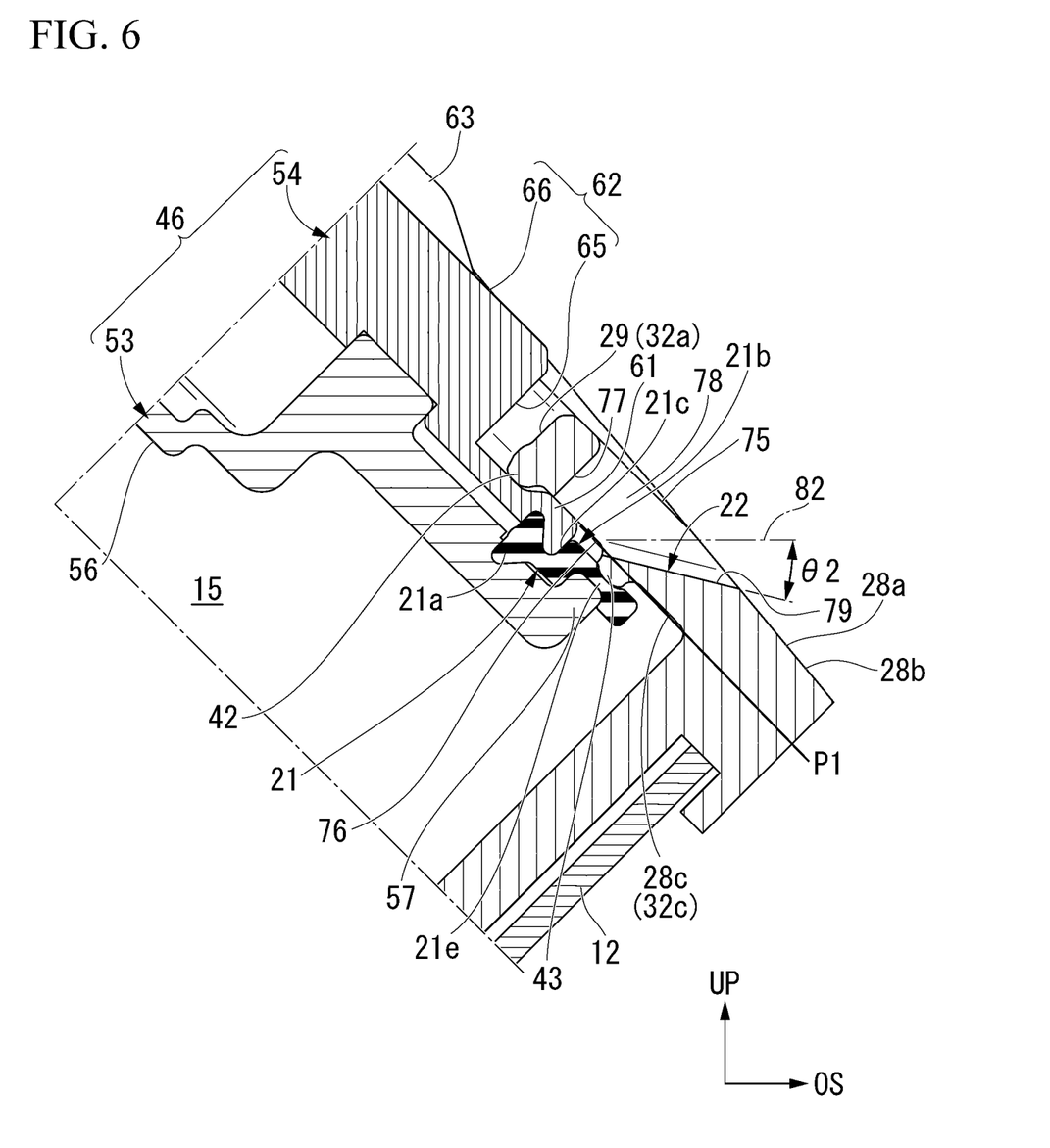
FIG. 6 is an enlarged cross-sectional view of a VI portion of FIG. 2.

FIG. 5 is a cross-sectional view along a V-V line of FIG. 1. FIG. 6 is an enlarged cross-sectional view of a VI portion of FIG. 2.

As shown in FIG. 5 and FIG. 6, the opening part 22 is formed on a lower part 28*a* of the fuel filler port outer circumferential part 28, for example, in a vehicle vertical direction of the fuel filler port outer circumferential part 28 of the base member 25. The lower part 28*a* of the fuel filler port outer circumferential part 28 is a portion close to a lower end part 29*a* in the vehicle vertical direction of the fuel filler port 29. That is, the opening part 22 is provided in the vicinity of the lower end part 29*a* in the vehicle vertical direction of the fuel filler port 29. The number of the opening part 22 is not limited to one, and a plurality of opening parts 22 may be provided in the vicinity of the lower end part 29*a* of the fuel filler port 29.

The opening part 22 includes a first opening end 75 and a second opening end (opening end) 76.

The first opening end 75 opens, for example, in a rectangular shape to a radially outer side than the fuel filler port protrusion part 42 in an outer surface (first surface) 28*b* of the fuel filler port outer circumferential part 28. The outer surface 28*b* of the fuel filler port outer circumferential part 28 is positioned on the insertion side of the fuel filler gun 40. That is, the first opening end 75 opens to a side of an insertion direction (outside of the fuel pipe 12) of the fuel filler gun 40. The outer surface 28*b* of the fuel filler port outer circumferential part 28 is formed of the outer surface 31*b* of the first ring part 31 and the outer surface 32*d* of the second ring part 32.

The second opening end 76 opens, for example, in a rectangular shape to a radially outer side than the fuel filler port protrusion part 42 in an inner surface (second surface) 28*c* of the fuel filler port outer circumferential part 28 similarly to the first opening end 75. The inner surface 28*c* of the fuel filler port outer circumferential part 28 is positioned on a side of the opening-closing valve 46. That is, the second opening end 76 opens to a side of the opening-closing valve 46 (the inner part 15 of the fuel pipe 12).

The inner surface 28*c* of the fuel filler port outer circumferential part 28 is formed of the inner surface of the first ring part 31 and the inner surface 32*c* of the second ring part 32. The second opening end 76 is arranged at a position that overlaps the opening-closing valve 46 when seen from the insertion side of the fuel filler gun 40 when the opening-closing valve 46 is located at the closed position P1.

The second opening end 76 is arranged at a radially outer side than the opening surface 32*a* of the fuel filler port 29. Further, the second opening end 76 is arranged at a radially inner side than the first seal protrusion 43 and the second seal protrusion 57 when the opening-closing valve 46 is located at the closed position P1. The space between the first seal protrusion 43 and the second seal protrusion 57 is sealed by the second protrusion section 21*e* (that is, the seal part 21).

Thereby, the second opening end 76 can be closed by the opening-closing valve 46 and the seal part 21 from the inner part 15 of the fuel pipe 12 when the opening-closing valve 46 is arranged at the closed position P1.

The opening part 22 extends to connect together the first opening end 75 and the second opening end 76 in a direction of insertion of the fuel filler gun 40, and thereby, the first opening end 75 and the second opening end 76 are in communication with each other. Thereby, the opening part 22 connects (communicates) so as to continuously penetrate to the outer surface 28*b* from the inner surface 28*c* of the fuel filler port outer circumferential part 28.

As shown in FIG. 4 and FIG. 6, the opening part 22 includes an upper surface 77, a pair of side surfaces 78, and a lower surface 79. The opening part 22 is formed, for example, of the upper surface 77, the pair of side surfaces 78, and the lower surface 79 such that an opening cross-section has a rectangular shape.

The upper surface 77 is an upper surface formed on an upper side of the opening part 22 in the vehicle vertical direction. The upper surface 77 extends at an upward gradient in the axis line direction from an upper side of the second opening end 76 to an upper side of the first opening end 75.

The lower surface 79 is a lower surface formed on a lower side of the opening part 22 in the vehicle vertical direction. The lower surface 79 is tilted by a tilt angle θ2 downward relative to a horizontal plane (horizon) 82 in accordance with a direction from a lower side (that is, the inner surface 28*c* of the fuel filler port outer circumferential part 28) of the second opening end 76 to a lower side (that is, the outer surface 28*b* of the fuel filler port outer circumferential part 28) of the first opening end 75.

One of the pair of side surfaces 78 extends from one side of the second opening end 76 to one side of the first opening end 75 of the opening part 22. Another of the pair of side surfaces 78 extends from another side of the second opening end 76 to another side of the first opening end 75 of the opening part 22. The pair of side surfaces 78 is formed, for example, along a radiation line that extends radially outward from the second axis line 36 of the fuel filler port 29. Accordingly, the pair of side surfaces 78 are formed such that a spacing in the circumferential direction is gradually enlarged from the upper surface 77 toward the lower surface 79.

That is, the opening part 22 is formed of the upper surface 77, the pair of side surfaces 78 and the lower surface 79 so as to open radially outward to be gradually larger in accordance with a direction from the second opening end 76 (the inner surface 28c of the fuel filler port outer circumferential part 28) toward the first opening end 75 (the outer surface 28b of the fuel filler port outer circumferential part 28).

The opening part 22 is formed in the vicinity (that is, the lower part 28a of the fuel filler port outer circumferential part 28) of the lower end part 29a of the fuel filler port 29. Further, in the opening part 22, the first opening end 75 and the second opening end 76 open to a radially outer side than the fuel filler port protrusion part 42. Thereby, the opening part 22 opens to a radially outer side than the fuel filler port protrusion part 42.

Additionally, the second opening end 76 opens to a radially outer side than the fuel filler port protrusion part 42. Thereby, in the opening part 22, the second opening end 76 communicates with the fuel filler port 29 via the labyrinth space when the opening-closing valve 46 is located at the closed position P1. The labyrinth space is formed of the fuel filler port protrusion part 42, the shutter member protrusion part 61, and the like.

As described above, according to the fuel filler structure 10 of the first embodiment, the opening part 22 is formed in the fuel filler port outer circumferential part 28, and the inner surface 28c and the outer surface 28b of the fuel filler port outer circumferential part 28 are connected (communicate with each other) by the opening part 22. Further, the opening part 22 includes the second opening end 76 that opens to the side of the shutter member 26. The second opening end 76 is arranged at a position that overlaps the opening-closing valve 46 when seen from the insertion side of the fuel filler gun 40 when the opening-closing valve 46 is located at the closed position P1. Additionally, the second opening end 76 communicates with the fuel filler port 29 via the labyrinth space formed of the fuel filler port protrusion part 42, the shutter member protrusion part 61, and the like when the opening-closing valve 46 is located at the closed position P1.

Accordingly, for example, fuel that is spilled to the fuel filler port 29 from the fuel filler gun 40 at the time of feeding the fuel can be guided via the labyrinth space to the second opening end 76 of the opening part 22. Further, the fuel guided to the second opening end 76 can be guided through the opening part 22 to the outside and be discharged. Thereby, it is possible to prevent the fuel that is spilled from the fuel filler gun 40 at the time of feeding the fuel from being left behind in the fuel filler structure 10.

The second opening end 76 is arranged at the position that overlaps the opening-closing valve 46 when seen from the insertion side of the fuel filler gun 40 when the opening-closing valve 46 is located at the closed position P1. Accordingly, it is conceivable that the seal part 21 faces the second opening end 76. Therefore, it is conceivable that the fuel guided to the second opening end 76 touches the seal part 21 and becomes difficult to flow smoothly to the opening part 22.

Accordingly, the lower surface 79 of the opening part 22 is tilted by a tilt angle θ2 downward relative to the horizontal plane 82. Thereby, the fuel or the like that is spilled from the fuel filler gun 40 is efficiently discharged to the outside through the opening part 22, for example, without accumulating on the seal part 21.

Further, the opening diameter D1 of the fuel filler port 29 is smaller than the inner diameter D2 of the seal part 21. Accordingly, it is possible to prevent fuel, water, dust, or the like from entering the seal part 21 from the fuel filler port 29. Thereby, for example, it is possible to prevent the seal property of the seal part 21 from being degraded by the fuel, water, dust, or the like. Further, for example, the fuel, water, dust, or the like that comes into contact with the seal part 21 can be discharged to the outside from the opening part 22 through the second opening end 76 that faces the seal part 21.

Additionally, the labyrinth space is formed of the fuel filler port protrusion part 42, the shutter member protrusion part 61, and the like. The labyrinth space is formed between the fuel filler port 29 and the seal part 21 in the radial direction. Thereby, it is possible to prevent dust or the like from entering the seal part 21 from the fuel filler port 29 by the labyrinth space.

Further, the opening part 22 opens to a radially outer side than the fuel filler port protrusion part 42. Accordingly, it is possible to prevent dust or the like from entering the fuel filler port 29 from the opening part 22 by the fuel filler port protrusion part 42 or the like (the labyrinth space).

In this way, the labyrinth space is formed of the fuel filler port protrusion part 42 and the shutter member protrusion part 61, and furthermore, the opening part 22 opens to a radially outer side than the fuel filler port protrusion part 42. Thereby, it is possible to prevent dust or the like from entering the seal part 21 from the fuel filler port 29, and furthermore, it is possible to further favorably prevent the seal property of the seal part 21 from being degraded by the dust or the like.

Further, when the opening-closing valve 46 is located at the closed position P1, the projection part 62 of the opening-closing valve 46 is arranged at the inside of the fuel filler port 29 and furthermore protrudes from the fuel filler port 29 (the outer surface 32d of the second ring part 32) toward the insertion side of the fuel filler gun 40. Accordingly, the fuel that leaks from the fuel filler gun 40 at the time of feeding the fuel can be received by the top surface 66 of the projection part 62, and it is possible to prevent the fuel that leaks from the fuel filler gun 40 at the time of feeding the fuel from entering the inside of the fuel filler port 29. Thereby, it is possible to prevent the fuel that leaks from the fuel filler gun 40 at the time of feeding the fuel from being directed to the seal part 21 through the labyrinth space from the fuel filler port 29.

Hereinafter, fuel filler structures according to a second embodiment to a fourth embodiment will be described with reference to FIG. 7 to FIG. 9. In the second to fourth embodiments, the same or similar configuration as the first embodiment is given by the same reference numeral, and detailed description thereof is omitted.

Second Embodiment

Figure 7:
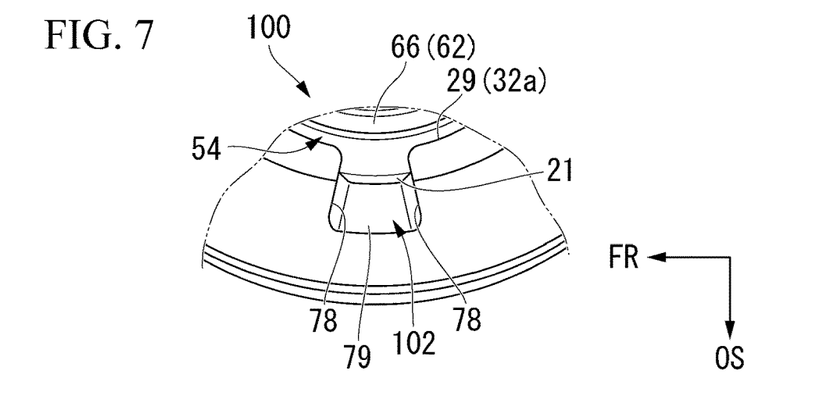
FIG. 7 is a plan view showing a fuel filler structure according to a second embodiment of the present invention.

FIG. 7 is a plan view showing a fuel filler structure 100 according to a second embodiment.

As shown in FIG. 7, the fuel filler structure 100 is obtained by replacing the opening part 22 of the first embodiment by an opening part 102, and the rest of configurations are similar to those of the fuel filler structure 10 of the first embodiment.

The opening part 102 opens to the opening surface 32a of the fuel filler port 29 obtained by removing the upper surface 77 of the opening part 22 of the first embodiment.

According to the opening part 102 of the second embodiment, it is possible to prevent the fuel that is spilled from the fuel filler gun 40 at the time of feeding the fuel from being left behind in the fuel filler structure 100 similarly to the opening part 22 of the first embodiment. Additionally, according to the opening part 102 of the second embodiment, it is also possible to obtain other advantages similar to the opening part 22 of the first embodiment.

Similarly to the opening part 22 of the first embodiment, the number of the opening part 102 is not limited to one, and a plurality of opening parts 102 may be provided in the vicinity (that is, the lower part 28a of the fuel filler port outer circumferential part 28) of the lower end part 29a of the fuel filler port 29. Further, a plurality of combinations of the opening part 22 of the first embodiment and the opening part 102 of the second embodiment may be provided.

Third Embodiment

Figure 8:
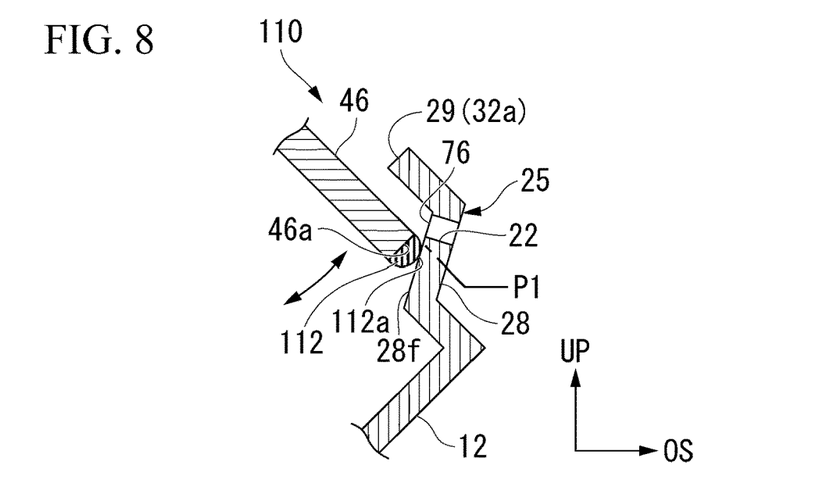
FIG. 8 is a cross-sectional view showing a fuel filler structure according to a third embodiment of the present invention.

FIG. 8 is a cross-sectional view showing a fuel filler structure 110 according to a third embodiment.

As shown in FIG. 8, the fuel filler structure 110 is obtained by replacing the seal part 21 of the first embodiment by a seal part 112, and the rest of configurations are similar to those of the fuel filler structure 10 of the first embodiment.

The seal part 112 is provided on an outer circumferential surface 46a of the opening-closing valve 46. The seal part 112 is in contact with an inner circumferential surface 28f of the fuel filler port outer circumferential part 28 when the opening-closing valve 46 is arranged at the closed position P1.

The second opening end 76 of the opening part 22 is arranged radially outward further than the opening surface 32a of the fuel filler port 29. Further, the second opening end 76 is arranged radially inward further than an outer circumference 112a of the seal part 112 when the opening-closing valve 46 is arranged at the closed position P1.

According to the seal part 112 of the third embodiment, it is possible to prevent the fuel that is spilled from the fuel filler gun 40 at the time of feeding the fuel from being left behind in the fuel filler structure 110 similarly to the seal part 21 of the first embodiment. Additionally, according to the seal part 112 of the third embodiment, it is also possible to obtain other advantages similar to the seal part 21 of the first embodiment.

Fourth Embodiment

Figure 9:
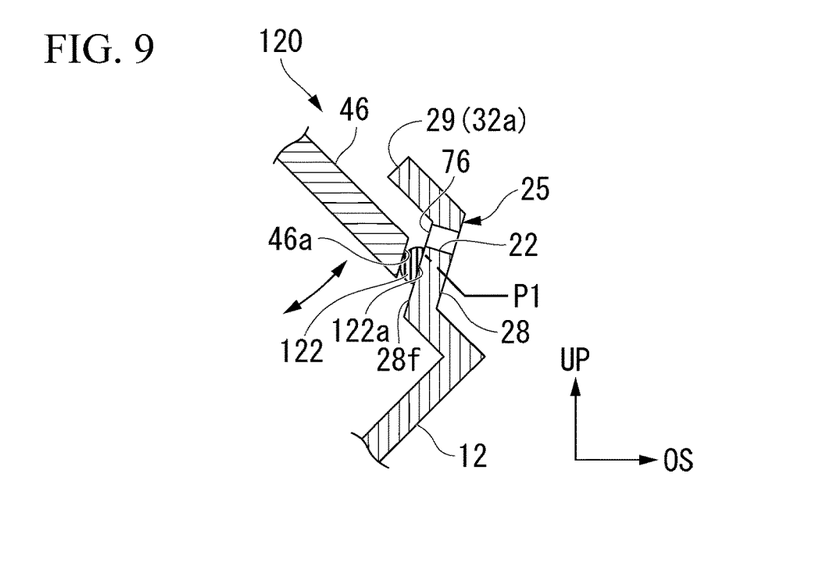
FIG. 9 is a cross-sectional view showing a fuel filler structure according to a fourth embodiment of the present invention.

FIG. 9 is a cross-sectional view showing a fuel filler structure 120 according to a fourth embodiment.

As shown in FIG. 9, the fuel filler structure 120 is obtained by replacing the seal part 112 of the third embodiment by a seal part 122, and the rest of configurations are similar to those of the fuel filler structure 110 of the third embodiment.

The seal part 122 is provided on the inner circumferential surface 28f of the fuel filler port outer circumferential part 28. The seal part 112 is in contact with the outer circumferential surface 46a of the opening-closing valve 46 when the opening-closing valve 46 is arranged at the closed position P1.

The second opening end 76 of the opening part 22 is arranged radially outward further than the opening surface 32a of the fuel filler port 29. Further, the second opening end 76 is arranged radially inward further than a base portion 122a of the seal part 122 when the opening-closing valve 46 is arranged at the closed position P1.

According to the seal part 122 of the fourth embodiment, it is possible to prevent the fuel that is spilled from the fuel filler gun 40 at the time of feeding the fuel from being left behind in the fuel filler structure 120 similarly to the seal part 112 of the third embodiment. Additionally, according to the seal part 122 of the second embodiment, it is also possible to obtain other advantages similar to the seal part 112 of the third embodiment.

The technical scope of the present invention is not limited to the embodiments described above, and various modifications can be made without departing from the scope of the present invention.

The components in the above embodiments can be replaced by known components without departing from the scope of the present invention, and such modified examples may be suitably combined.

What is claimed is:
1. A fuel filler structure, comprising:
a base member that is attached to an upper end part of a fuel pipe which supplies fuel to a fuel tank and that includes a fuel filler port in which a fuel filler gun is inserted and a fuel filler port outer circumferential part which is provided radially outward further than the fuel filler port;
a shutter member that is attached to the base member and that is movable to a position at which the fuel filler port is closed and to a position at which the fuel filler port is opened;
a seal part that is arranged between the fuel filler port outer circumferential part and the shutter member when the shutter member is located at the position at which the fuel filler port is closed;
an opening part that is formed on the fuel filler port outer circumferential part and that connects together a first surface of the fuel filler port outer circumferential part positioned on an insertion side of the fuel filler gun and a second surface of the fuel filler port outer circumferential part positioned on a side of the shutter member;
a fuel filler port protrusion part that extends in a circumferential direction along an opening surface of the fuel filler port and that protrudes toward the shutter member from a vicinity of the opening surface when the shutter member is located at the position at which the fuel filler port is closed; and
a shutter member protrusion part that is formed on the shutter member and that extends in a circumferential direction along the fuel filler port protrusion part at a radially outer side than the fuel filler port protrusion part and protrudes toward the fuel filler port outer circumferential part when the shutter member is located at the position at which the fuel filler port is closed,
wherein an opening end that opens to the side of the shutter member of the opening part is arranged at a position that overlaps the shutter member in a view from the insertion side of the fuel filler gun when the shutter member is located at the position at which the fuel filler port is closed, and the opening part opens radially outward further than the fuel filler port protrusion part.

2. The fuel filler structure according to claim 1, wherein the opening part is provided at one or more positions in a vicinity of a lower end part in a vehicle vertical direction of the fuel filler port and includes a lower surface that is formed on a lower side in a vehicle vertical direction of the opening part and that is tilted downward relative to a horizon in accordance with a direction from the second surface to the first surface.

3. The fuel filler structure according to claim 1, wherein the fuel filler port has a diameter which is smaller than an inner diameter of the seal part.

4. The fuel filler structure according to claim 1, wherein the shutter member includes a projection part that protrudes toward the insertion side of the fuel filler gun at a radially inner side of the fuel filler port when the shutter member is located at the position at which the fuel filler port is closed.

* * * * *